> United States Patent Office 3,787,522
Patented Jan. 22, 1974

3,787,522
ACRYLATE POLYMER PARTICLES COMPRISING A CORE, AN OUTER SHELL, AND AN INTERMEDIATE LAYER
Ray A. Dickie, Birmingham, and Seymour Newman, Southfield, Mich., assignors to Ford Motor Company, Dearborn, Mich.
No Drawing. Continuation-in-part of abandoned application Ser. No. 100,464, Dec. 21, 1970. This application Nov. 1, 1972, Ser. No. 302,700
Int. Cl. C08f 15/18
U.S. Cl. 260—836          18 Claims

ABSTRACT OF THE DISCLOSURE

Novel thermoplastic materials in particulate form have (1) a core of crosslinked acrylic polymer formed from a major amount of monofunctional, monoacrylate and a crosslinking amount of a di- or tri-functional monomer containing two or more non-conjugated terminal ethylenic groups, (2) a polymeric outer shell formed by polymerizing monomers of methyl methacrylate or a mixture of methyl methacrylate and monomers copolymerizable therewith and (3) an intermediate layer consisting essentially of the copolymerization product of additional monomers of the type used to form the crosslinked acrylic polymer and additional monomers of the type used to form said outer shell. Said intermediate layer is formed by introducing said shell-forming monomers into the polymerization of said core-forming monomers when polymerization of said core-forming monomers is between about 50 and about 90 percent complete. The particles can be molded so as to form transparent articles of manufacture and the relative proportions of their components can be varied to produce moldings having a wide variety of tensile properties. The particles also have utility as unique modifiers for thermoplastic and thermosetting materials. The outer layer can be prepared so as to provide reactive functional groups on its surfaces.

---

This application is a continuation-in-part application of application Ser. No. 100,464, filed Dec. 21, 1970, now abandoned.

THE INVENTION

Unique particulate materials are formed by emulsion polymerization having a rubber-like core of crosslinked acrylic polymer, a glass-like polymeric outer shell consisting essentially of poly (methyl methacrylate) or a copolymer of about 30 to about 99 molar parts of methyl methacrylate and about 1 to about 70 molar parts of monomers copolymerizable with methyl methacrylate, and an intermediate layer consisting essentially of the copolymerization product of additional monomers of the type used to form the crosslinked acrylic polymer core and additional monomers of the type used to form the glass-like outer shell. Unique moldings can be prepared from the particulate materials and certain embodiments thereof have utility as intermediates in the preparation of a wide variety of other materials.

DETAILED DESCRIPTION OF THE INVENTION

The process for preparing these particulate materials is at least a two-stage process. A major amount of monofunctional monoacrylate is emulsion copolymerized in the first stage with a crosslinking amount of a di- or tri-functional monomer containing two or more non-conjugated terminal ethylenic groups, preferably a divinyl hydrocarbon or a diacrylate monomer, using a water-soluble free radical initiator and a suitable surfactant to yield a latex of relatively uniform particle size, e.g. 0.04 to 1 micron average diameter. Before this reaction reaches substantial completion, i.e. when the reaction is between about 50 and about 90, preferably between about 70 and about 89, percent complete, the second stage monomeric component, i.e. methyl methacrylate or a monomer mixture comprising methyl methacrylate, is added slowly to the reaction mixture. The polymerization process is continued to yield a stable latex of relatively uniform particle size and composition as evidenced by electron microscopy. Additional surfactant may be added simultaneously with the second stage monomeric component.

The latex is coagulated, washed, and dried to yield a finely divided white powder suitable for conventional methods of molding, e.g. compression, injection, etc.

Transparent and thermoplastic moldings can be prepared from these particles without the addition of other materials. For instance, using butyl acrylate and 1,3-butylene dimethacrylate as the first stage reactants and methyl methacrylate as the second stage reactant, a molding composition consisting of such particles provides a thermoplastic article that is transparent throughout the compositional range. When the particles are to be used to produce transparent moldings, it is advantageous to have the refractive indices of the core and outer shell coincide as closely as possible. Thus, in such embodiments, it is advantageous to add to the composition of the core a minor amount of other monomers, e.g. styrene, alpha methyl styrene and/or benzyl acrylates, which will raise the refractive index of the core or to add to the composition of the shell a minor amount of other monomers which will lower the refractive index of the shell. For instance, when the monoacrylate of the core is butyl acrylate or 2-ethyl hexyl acrylate and styrene is added for this purpose, it is advantageously employed in an amount constituting about 10 to about 30, preferably about 15 to about 25, mole percent of the monomers used to form the core.

It is one object of this invention to employ monomers that will provide a crosslinked, acrylic, rubber-like core and a glass-like polymeric outer shell at room temperature, e.g. 20°–30° C. The terms rubber-like and glass-like are, of course, meaningless except when used in reference to a specific temperature or temperature range. The particles should be formulated so that when molded the core retains such rubber-like properties and the outer shell retains its glass-like properties at all temperatures encountered by articles of commerce in the intended field of use. Hence, for practical purposes, the core should have a glass transition temperature that is substantially below that of the outer layer or shell. Advantageously, the difference in glass transition temperatures between core and shell is at least 50° C., preferably above 100° C.

The core is formed from a major amount of an alkyl acrylate and a crosslinking amount of a di- or tri-functional monomer containing two or more non-conjugated terminal ethylenic groups. The monofunctional alkyl acrylate is preferably an ester of a $C_2$–$C_8$ monohydric alcohol and acrylic acid, e.g. ethyl acrylate, butyl acrylate, hexyl acrylate, 2-ethyl hexyl acrylate and/or mixtures of the same. Certain other alkyl acrylates may be used when the crosslinked polymer thereof has an appropriate glass transition temperature, e.g. dodecyl methacrylate. Butyl acrylate and 2-ethyl hexyl acrylate are the most preferred of the monoacrylates for use in forming the core. The polymers produced from most methacrylates have glass transition temperatures which are too high to provide rubber-like properties at normally encountered temperatures. Hence, except for special use applications, the monoacrylate component of the core will be either an ester (or esters) of acrylic acid or a mixture of a major amount of the same and a minor amount of methacrylates.

Suitable crosslinking agents include, but not by way of limitation:

1,3-butylene diacrylate,
1,3-butylene dimethacrylate,
divinyl benzene,
1,6-hexamethylene diacrylate,
1,6-hexamethylene dimethacrylate,
1,1,1-trimethylol ethane triacrylate,
1,1,1-trimethylol ethane trimethacrylate,
1,1,1-trimethylol propane triacrylate,
1,1,1-trimethylol propane trimethacrylate,
1,4-dimethylol cyclohexane dimethacrylate,
allyl acrylate,
allyl methacrylate,
methallyl acrylate,
methallyl methacrylate,
diallyl maleate,
diallyl fumarate, and
diallyl phthalate.

In one embodiment, the crosslinking agent is a di- or triester of acrylic or methacrylic acid and a $C_2$–$C_8$, preferably a $C_2$–$C_6$ dihydric or trihydric alcohol.

In the first stage reaction, there is employed at a minimum about 80 mole percent, preferably about 80 to about 98 mole percent of the monofunctional monoacrylate and a minor and crosslinking amount not exceeding about 20 mole percent, preferably between about 20 to about 2 mole percent of the crosslinking agent. The amounts of second stage reactant or reactants relative to the combined first stage reactants may vary widely depending upon the physical properties desired in the moldings produced from these particles, i.e. from about 10 to about 90 to about 10 weight percent.

The particulate materials can be viewed as falling into two functional subclasses, i.e. those having surface functionality and those without surface functionality.

In the subclass wherein the particles are without significant surface functionality, the outer shell may be formed from monomers consisting essentially of methyl methacrylate or a mixture of monomers consisting essentially of about 30 to about 99 mole percent methyl methacrylate and a "balance" of about 1 to about 70 mole percent of monomers copolymerizable with methyl methacrylate. For most embodiments, the latter are monofunctional, monoacrylates formed by esterification of acrylic or methacrylic acid with a preferably $C_1$–$C_8$ monohydric alcohol, e.g. ethyl acrylate, butyl acrylate, butyl methacrylate, and 2-ethyl hexyl acrylate. A minor amount of higher alkyl acrylate, e.g. dodecyl methacrylate, may also be used. Depending upon the intended end use, it will sometimes be advantageous to employ vinyl hydrocarbons in said "balance." Where the "balance" is relatively small, i.e. about 1 to about 30 mole percent of the monomer mixture, the "balance" may consist solely of vinyl hydrocarbons. Where the "balance" is relatively large, i.e. about 30 to about 70 mole percent of the monomer mixture, the vinyl hydrocarbons will be employed in combination with the aforementioned monofunctional, monoacrylates. For most purposes, the vinyl hydrocarbon component will not advantageously exceed 30 mole percent of the total monomer mix used to form the outer shell. Ordinarily, the vinyl hydrocarbons employed will be selected from monofunctional compounds such as styrene or a substituted styrene, e.g. alpha methyl styrene. These should not be used in embodiments wherein transparency is desired in the molded product. Again, depending upon the end product desired, it will sometimes be advantageous to have a limited amount of crosslinking in the outer shell and hence to include in said "balance" a minor amount of a diacrylate or divinyl hydrocarbon, e.g. divinyl benzene or 1,3-butylene diacrylate.

The subclass of particulate materials without significant surface functionality are suitable for molding with each other and with other thermoplastic materials, e.g. poly (methyl methacrylate). They may be incorporated in thermosetting materials to modify the physical properties of moldings made therefrom but they are not as desirable for this purpose as the particles hereinafter described.

The subclass of particles having surface functionality is made up of particles prepared by the methods hereinbefore and hereinafter described and have incorporated in their surfaces di- or tri-functional monomers which are copolymerizable with methyl methacrylate and/or with other monomers which are copolymerizable with methyl methacrylate. When formed, these particles have a plurality of reactive sites upon their external surfaces. This functionality includes, but is not limited to, epoxy, carboxy, and hydroxy functionality. A variety of embodiments are available for producing the outer shells of this subclass. Again, the minimum concentration of methyl methacrylate in the monomer mix will be about 30 mole percent. In one such embodiment, the monomer mix used for the second stage polymerization will contain about 30 to about 99 mole percent methyl methacrylate, 0 to 35 mole percent of a compound or compounds selected from monovinyl hydrocarbons and other monofunctional acrylates such as those heretofore described with respect to the other subclass, and about 1 to about 45, advantageously about 5 to about 40, and preferably about 10 to about 35 mole percent of one or more difunctional monoacrylates such as glycidyl methacrylate, hydroxyethyl acrylate, hydroxyethyl methacrylate, hydroxypropyl acrylate, hydroxypropyl methacrylate, mixtures thereof, and/or other epoxide or hydroxyl bearing monoacrylates. Carboxy functionality can be provided by adding a small amount, e.g. about 1 to about 10 mole percent, of acrylic or methacrylic acid to the monomer mix used to form the outer shell. This is preferably added in a last fraction of monomers to be introduced. If vinyl hydrocarbons or acrylates other than methyl methacrylate are employed with the di- or trifunctional compounds, the vinyl hydrocarbons and/or acrylates so employed are preferably the monofunctional monoacrylates and/or monofunctional vinyl hydrocarbons described before in connection with the "balance" used in the preparation of the particles having no significant surface functionality.

The physical properties of the outer shell may be modified by replacing up to about 30 mole percent of the monofunctional monoacrylate with acrylonitrile or methacrylonitrile. This may be done in either of the aforedescribed subclasses. Likewise, one may replace up to about 30 mole percent of the monofunctional monoacrylates heretofore mentioned with an equimolar amount of isobornyl methacrylate. In each of these embodiments, as in all others, the monomer mix used to form the outer shell would still contain at least about 30 mole percent methyl methacrylate.

These materials have utility as modifiers of thermoset polymers and as intermediates for forming other rubber-like and/or rubber-modified materials. In addition, they may be molded with each other or with other thermoplastic materials.

It is also within the scope of this invention to carry out further reactions after particle formation, as, for instance, to react a di- or trifunctional monomer with a functionality of said surface in order to alter the character or functionality of said surface.

The initial monomer charge is usually emulsified by one or more micelle-forming compounds composed of a hydrophobic part, such as a hydrocarbon group containing eight or more carbon atoms, and a hydrophilic part, such as alkali metal or ammonium carboxylate groups, phosphate or sulfate partial ester groups, sulfonate groups, and the like. Exemplary emulsifying agents include alkali metal sulfonates of styrene, naphthalene, decyl benzene, and dodecyl benzene; sodium dodecyl sulfate; sodium stearate; sodium oleate; the sodium alkyl aryl polyoxymethylene sulfates and phosphates; the ethylene oxide condensates of long chain fatty acids, alcohols, and mercaptans, and the alkali metal salts or rosin acids. These materials and the techniques of their employment in emulsion formation and maintenance are well known to the art. As they are conventional materials employed in a conventional manner, further description and explanation is unnecessary to one skilled in the art.

The polymerization initiator is composed of one or more water-soluble, free-radical-generating species such as hydrogen peroxide or the sodium, potassium, or ammonium persulfates, perborates, peracetates, percarbonates, and the like. As is well known in the art, these initiators may be associated with activating systems such as redox systems which may incorporate mild reducing agents such as sulfites and thiosulfites and redox reaction promoters such as transition metal ions.

A chain transfer agent or mixture of chain transfer agents may be added to the reaction medium to limit the molecular weight of the polymer; such chain transfer agents are generally mercaptans such as dodecanethiol, benzenethiol, pentanethiol, and butanethiol.

Those skilled in the art will be aware that other emulsifying agents, polymerization initiators and chain transfer agents may be used when compatible with the polymerization system herein required.

The reaction may be carried out at temperatures from about 40° C. to 80° C., or at lower temperatures, as from 0° C. to 80° C. in the case of activated systems.

This invention will be more fully understood from the following illustrative examples:

Example 1

To 1,000 parts by weight water which has been boiled and cooled to room temperature under a nitrogen atmosphere are added 2.86 parts by weight sodium dodecyl sulfate dissolved in 35.7 parts water and one third of a monomer mixture consisting of 173.6 parts by weight butyl acrylate and 16.15 parts by weight 1,3-butylene dimethacrylate. The mixture is stirred to establish dispersion of the monomers. To the stirred mixture are added 3.14 parts by weight potassium persulfate dissolved in 71.4 parts by weight water. The mixture is heated to 45° C. After about 10 minutes, addition of the remainder of the first monomer mixture is begun at a rate such that the temperature of the reaction mixture is maintained at 47° to 50° C.

Following completion of the addition of the first monomer mixture, which requires about 25 minutes, the reaction mixture is maintained at about 47° C. for 25 minutes. When conversion of the rubber phase monomers is between 85 and 90%, the simultaneous dropwise addition of 568 parts by weight methyl methacrylate and 8.57 parts by weight sodium dodecyl sulfate dissolved in 35.7 parts by weight water is begun at a rate such that the temperature of the reaction mixture is maintained at 47° to 50° C. This addition requires about 60 minutes. Following this monomer addition, the reaction mixture is maintained at 47° to 50° C. for an additional 90 minutes. The resulting latex is cooled and neutralized with aqueous ammonia. Monomer conversion is approximately 100%.

Particles from the latex are examined with an electron microscope. The particles prove to be dimensionally stable and are spherical in appearance. Size of these particles is found to be in the range of about 0.1 to 0.2 micron. There is no evidence of particles consisting solely of the rubbery polymer or having the physical properties characteristic of a particle consisting essentially of the rubbery polymer.

The latex obtained from the above described procedure is coagulated by adding one volume of latex to approximately four volumes of methyl alcohol to which have been added 0.001 volume concentrated hydrochloric acid. The coagulum is isolated by filtration, washed with several volumes methyl alcohol, washed with water, and dried in vacuo. The material so obtained is compression molded for two minutes at about 400° F., and cut into tensile specimens. The molded specimens are transparent and exhibit the following room temperature tensile properties:

| | |
|---|---|
| Yield stress, p.s.i. | 5,700 |
| Elongation-to-break, percent | 38 |
| Modulus, p.s.i. | 248,000 |

Example 2

To 1,000 parts by weight water which has been boiled and cooled to room temperature under a nitrogen atmosphere are added 2.86 parts sodium dodecyl sulfate dissolved in 35.7 parts by weight water and about ⅙ of a monomer mixture consisting of 348 parts by weight butyl acrylate and 32.3 parts by weight 1,3-butylene dimethacrylate. The mixture is stirred to establish dispersion of the monomers. To the stirred mixture are added 3.14 parts by weight potassium persulfate dissolved in 71.4 parts by weight water and the mixture is heated to 45° C. After about ten minutes, addition of the remainder of the first monomer mixture is begun at a rate such that the temperature of the reaction mixture is maintained at 47° to 49° C. The last half of the first monomer mixture is added simultaneously with 2.86 parts by weight of sodium dodecyl sulfate dissolved in 35.7 parts by weight water. Addition of the first monomer mixture requires about 45 minutes. The reaction mixture is maintained at 47° to 49° C. for 35 minutes prior to beginning simultaneous dropwise addition of 380.3 parts by weight methyl methacrylate and 5.72 parts by weight sodium dodecyl sulfate dissolved in 35.7 parts by weight of water. This addition, which requires about 40 minutes, is carried out at such a rate that the temperature of the reaction mixture is maintained at 48° to 50° C. Following this addition, the mixture is maintained at 47° to 49° C. for an additional two hours. The resulting latex is cooled and neutralized with aqueous ammonia. The overall conversion of monomers is about 98%.

Particles from the latex are examined with an electron microscope. The particles prove to be moderately dimensionally stable. They appear as slightly flattened spheres. Their composition appears to be uniform. There is no evidence of purely rubbery particles or purely glassy particles.

These particles are molded using the same procedure used in Example 1. The molded specimens are transparent and exhibit the following room temperature tensile properties:

| | |
|---|---|
| Yield stress, p.s.i. | 3,000 |
| Elongation-to-break, percent | 88 |
| Modulus, p.s.i. | 128,000 |

Example 3

To 1,000 parts by weight water which has been boiled and cooled to room temperature under a nitrogen atmosphere are added 2.86 parts by weight sodium dodecyl sulfate dissolved in 35.7 parts by weight water and about ⅙ of a monomer mixture consisting of 521 parts butyl acrylate and 48.5 parts by weight of 1,3-butylene dimethacrylate. This mixture is stirred to establish dispersion of the monomers and 3.14 parts by weight potassium persulfate dissolved in 71.4 parts by weight water are added to the stirred mixture. This mixture is heated to 45° C. After about ten minutes, addition of the remainder of the first monomer mixture is begun at a rate such that the temperature of the reaction mixture is maintained at 47° to 50° C. During the addition of the last two-thirds of the first monomer mixture, 5.72 parts by weight sodium dodecyl sulfate is dissolved in 35.7 parts water and added at a substantially constant rate. The reaction mixture is maintained at 47° to 50° for about 40 minutes prior to beginning simultaneous dropwise addition of 190 parts by weight methyl methacrylate and 2.86 parts by weight sodium dodecyl sulfate dissolved in 35.7 parts by weight water. This addition, which requires about 30 minutes, is carried out at such a rate that the temperature of the reaction mixture is maintained at 47° to 50° C. Following this addition, the mixture is maintained at 47° to 49° C. for an additional two hours. The resulting latex is cooled and neutralized with aqueous ammonia. The overall monomer conversion is about 97%.

Particles from the latex are examined using the electron microscope. The particles prove to be moderately dimensionally stable. They appear as flattened spheres. Composition is not as uniform as in the preceding examples. There is a minor fraction of particles which appear to be unmodified rubber particles.

These particles are molded using the same procedure used in Example 1. The molded specimens are transparent and exhibit the following room temperature tensile properties:

Yield stress, p.s.i. _____ 690
Elongation-to-break, percent _____ 150
Modulus, p.s.i. _____ 28,000

Example 4

To 1,000 parts by weight water which has been boiled and cooled to room temperature under a nitrogen atmosphere are added 1.43 parts by weight sodium dodecyl sulfate dissolved in 35.7 parts by weight water, 57.8 parts by weight butyl acrylate and 5.43 parts by weight 1,3-butylene dimethacrylate. This mixture is stirred to establish dispersion of the monomers and 3.14 parts by weight potassium persulfate dissolved in 71.4 parts by weight water are added. The reaction mixture is heated to about 45° C. After about 30 minutes, during which time the temperature of the reaction mixture is maintained at about 48° to about 50° C., the simultaneous dropwise addition of 568 parts by weight methyl methacrylate and 5.72 parts sodium dodecyl sulfate in 35.7 parts by weight water is begun at a rate such that the temperature of the reaction mixture is maintained at 48° to 50° C. This addition requires about 60 minutes. The reaction mixture is maintained within a temperature range of about 47° to about 50° C. for an additional two (2) hours. The resulting latex is cooled and coagulated as described in Example 1.

These particles are molded using the same procedure used in Example 1. The molded specimens are transparent and exhibit the following room temperature tensile properties:

Yield stress, p.s.i. _____ 8,260
Elongation-to-break, percent _____ 12
Modulus, p.s.i. _____ 360,000

Example 5

The procedure of Example 4 is repeated except that the second monomer addition consists of 297 parts by weight methyl methacrylate and is added simultaneously dropwise with 2.86 parts by weight sodium dodecyl sulfate dissolved in 35.7 parts by weight water over a 30 minute period. These particles are molded using the same procedure used in Example 1. The molded specimens are transparent and exhibit the following room temperature tensile properties:

Yield stress, p.s.i. _____ 7,200
Elongation-to-break, percent _____ 14
Modulus, p.s.i. _____ 310,000

Example 6

The procedures of Examples 1–5 are repeated with the difference that the glass-like polymer of the outer shell is formed from a monomeric mixture consisting essentially of 40 mole percent methyl methacrylate, 30 mole percent methacrylonitrile, and 30 mole percent glycidyl methacrylate.

Example 7

The procedures of Examples 1–5 are repeated with the difference that the glass-like polymer of the outer shell is formed from a monomeric mixture consisting essentially of 40 mole percent methyl methacrylate, 30 mole percent methacrylonitrile, and 30 mole percent hydroxy propyl methacrylate.

Example 8

The procedures of Examples 1–5 are repeated with the difference that the glass-like polymer of the outer shell is formed from a monomeric mixture consisting essentially of 40 mole percent methyl methacrylate, 30 mole percent acrylonitrile, and 30 mole percent hydroxy ethyl methacrylate.

Example 9

The procedures of Examples 1–5 are repeated with the difference that the glass-like polymer of the outer shell is formed from a monomeric mixture consisting essentially of 40 mole percent methyl methacrylate, 30 mole percent methacrylonitrile, and 30 mole percent hydroxy ethyl acrylate.

Example 10

The procedures of Examples 1–5 are repeated with the difference that the glass-like polymer of the outer shell is formed from a monomeric mixture consisting essentially of 40 mole percent methyl methacrylate, 30 mole percent acrylonitrile, and 30 mole percent hydroxy propyl acrylate.

Example 11

The procedures of Examples 1–5 are repeated with the difference that the glass-like polymer of the outer shell is formed from a monomeric mixture consisting essentially of 80 mole percent methyl methacrylate and 20 mole percent of glycidyl methacrylate.

Example 12

The procedures of Examples 1–5 are repeated with the difference that the glass-like polymer of the outer shell is formed from a monomeric mixture consisting essentially of 80 mole percent methyl methacrylate and 20 mole percent of hydroxyethyl methacrylate.

Example 13

The procedures of Examples 1–5 are repeated with the difference that the glass-like polymer of the outer shell is formed from a monomeric mixture consisting essentially of 60 mole percent methyl methacrylate, 15 mole percent methacrylonitrile, and 25 mole percent glycidyl methacrylate.

Example 14

The procedures of Examples 1–5 are repeated with the difference that the glass-like polymer of the outer shell is formed from a monomeric mixture consisting essentially of 60 mole percent methyl methacrylate, 15 mole percent methacrylonitrile, and 25 mole percent hydroxyethyl methacrylate.

Example 15

The procedures of Examples 1–5 are repeated with the difference that the glass-like polymer of the outer shell is formed from a monomeric mixture consisting essentially of 60 mole percent methyl methacrylate, 15 mole percent acrylonitrile, and 25 mole percent glycidyl methacrylate.

Example 16

The procedures of Examples 1–5 are repeated with the difference that the glass-like polymer of the outer shell is formed from a monomeric mixture consisting essentially of 60 mole percent methyl methacrylate, 15 mole percent acrylonitrile, and 25 mole percent hydroxypropyl methacrylate.

Example 17

The procedures of Examples 1–5 are repeated with the difference that the monomers used to form the rubber-like core are ethyl acrylate and 1,3-butylene dimethacrylate.

Example 18

The procedures of Examples 1–5 are repeated with the difference that the monomers used to form the rubber-like core are ethyl acrylate and divinyl benzene.

Example 19

The procedures of Examples 1–5 are repeated with the difference that the monomers used to form the rubber-like core are 2-ethyl hexyl acrylate and 1,3-butylene dimethacrylate.

Example 20

The procedures of Examples 1–5 are repeated with the difference that the monomers used to form the rubber-like core are 2-ethyl hexyl acrylate and 1,3-butylene diacrylate.

Example 21

The procedures of Examples 1–5 are repeated with the difference that the monomers used to form the rubber-like core are butyl acrylate and divinyl benzene.

Example 22

The procedures of Examples 1–5 are repeated with the difference that the monomers used to form the rubber-like core are butyl acrylate and 1,3-butylene diacrylate.

Example 23

The procedure of Example 1 is repeated with the difference that the monomers of the glass-like outer shell are divided into two equal portions. The second portion of these to be added to the reaction mix contains 0.5 weight percent benzenethiol.

Example 24

The procedure of Example 23 is repeated with the difference that the monomers used to form the rubber-like core are 2-ethyl hexyl acrylate, styrene, and 1,3-butylene dimethacrylate. These are present in a mole ratio of 75.5:20:4.5. This material is transparent upon compression molding and upon injection molding.

Example 25

The procedure of Example 1 is repeated with the difference that the monomers of the glass-like outer shell are divided into two portions; the first of these to be added to the reaction mix consists of 10% by weight of the total of the monomers. The second portion which consists of 90% by weight of the monomers contains 0.5 weight percent benzene-thiol.

Example 26

The procedure of Example 25 is repeated with the difference that the monomers used to form the rubber-like core are butyl acrylate, styrene and 1,3-butylene dimethacrylate. These are present in a mole ratio of 75.5:20:4.5.

Example 27

The procedure of Example 24 is repeated with the difference that the monomers used to form the rubber-like core are 2-ethyl hexyl acrylate, styrene, and 1,3-butylene dimethacrylate. These are present in the mole ratio of 85:10:5.

Example 28

The procedure of Example 24 is repeated with the difference that the monomers used to form the rubber-like core are 2-ethyl hexyl acrylate, styrene, and 1,3 butylene dimethacrylate. These are present in the mole ratio of 67:30:3.

Example 29

The procedure of Example 1 is repeated with the difference that 20 mole percent of the methyl methacrylate is replaced with an equimolar amount of styrene.

Example 30

The procedure of Example 1 is repeated with the difference that 10 mole percent of the methyl methacrylate is replaced with an equimolar amount of 1,3-butylene dimethacrylate.

Example 31

The procedure of Example 1 is repeated with the difference that 10 mole percent of the methyl methacrylate is replaced with an equimolar amount of divinyl benzene.

Example 32

The procedure of Example 1 is repeated with the difference that 40 mole percent of the methyl methacrylate is replaced with 10 mole percent ethyl acrylate, 10 mole percent butyl acrylate, 10 mole percent butyl methacrylate, and 10 mole percent 2-ethyl hexyl acrylate.

Example 33

The procedure of Example 1 is repeated with the difference that 30 mole percent of the methyl methacrylate is replaced with an equimolar amount of hyrdoxyethyl methacrylate.

Example 34

The procedure of Example 1 is repeated with the difference that 20 mole percent of the methyl methacrylate is replaced with an equimolar amount of hyrdoxypropyl acrylate.

Example 35

The procedure of Example 1 is repeated with the difference that 5 mole percent of the methyl methacrylate is replaced with an equimolar amount of methacrylic acid.

Example 36

The procedure of Example 1 is repeated with the difference that 5 mole percent of the methyl methacrylate is replaced with an equimolar amount of acrylic acid.

Example 37

The procedure of Example 1 is repeated with the difference that 1,3-butylene dimethacrylate is replaced with an equimolar amount of 1,4-cyclohexane dimethanol dimethacrylate.

Example 38

The procedure of Example 1 is repeated with the difference that the 1,3-butylene dimethacrylate is replaced with an equimolar amount of 1,6-hexamethylene diacrylate.

Example 39

The procedure of Example 1 is repeated with the difference that the 1,3-butylene dimethacrylate is replaced with an equimolar amount of 1,6-hexamethylene dimethacrylate.

Example 40

The procedure of Example 1 is repeated with the difference that the 1,3-butylene dimethacrylate is replaced with a functionally equivalent amount of 1,1,1-trimethylol trimethacrylate.

Example 41

The procedure of Example 1 is repeated with the difference that the monomers used to form the rubber-like core are butyl acrylate, acrylonitrile and 1,3-butylene dimethacrylate. They are present in the mole ratio of 80:15:5.

Example 42

The procedure of Example 1 is repeated with the difference that the monomers used to form the rubber-like core are butyl acrylate, acrylonitrile and 1,3-butylene dimethacrylate. They are present in the mole ratio of 70:25:5.

Example 43

The procedure of Example 1 is repeated with the difference that the monomers used to form the rubber-like core are butyl acrylate, methacrylonitrile and 1,3-butylene dimethacrylate. They are present in the mole ratio of 85:10:5.

Example 44

The procedure of Example 1 is repeated with the difference that the monomers used to form the rubber-like core are butyl acrylate, methacrylonitrile and 1,3-butylene dimethacrylate. They are present in the mole ratio of 75:20:5.

The terms "acrylate" and "acrylates," when used herein without a modifier distinguishing between esters of acrylic and methacrylic acids, shall be understood to include both. This, of course, does not apply to the naming of a specific compound.

Those skilled in the art will recognize from the general disclosures herein that additional examples, which may or may not be modifications of the foregoing examples, are within the scope of this invention as expressed in the claims. For instance, where desired, reinforcing fillers such as asbestos, glass fibers, clay, calcium carbonate, calcium silicate, etc., may also be incorporated into the moldings prepared from these particulate materials.

We claim:

1. Particulate material consisting essentially of
   (1) a core of crosslinked acrylic polymer of core-forming monomers consisting essentially of
      (a) a minor and crosslinking amount of a di- or tri-functional monomer containing 2 or more non-conjugated terminal ethylenic groups, said minor and crosslinking amount not exceeding about 20 mole percent of the core-forming monomers, and
      (b) a remainder consisting essentially of a monofunctional monoacrylate, said remainder constituting at a minimum about 80 mole percent of the core-forming monomers,
   (2) an outer shell consisting essentially of the polymerization product of shell-forming monomers selected from the group consisting of
      (a) methyl methacrylate and
      (b) a mixture of methyl methacrylate and a remainder selected from the group consisting of monofunctional monoacrylate, difunctional monoacrylates, monovinyl hydrocarbons, divinyl hydrocarbons, acrylonitrile, methacrylonitrile, acrylic acid and methacrylic acid, said methyl methacrylate comprising at least 30 mole percent of said mixture, and
   (3) an intermediate layer between said core and said shell consisting essentially of the copolymerization product of said core-forming monomers and said shell-forming monomers and formed by introducing said shell-forming monomers into the polymerization of said core-forming monomers when polymerization of said core-forming monomers is between about 50 and about 90 percent complete, said core-forming monomers comprising about 10 to about 90 weight percent of said particulate material, said shell-forming monomers comprising about 90 to about 10 weight percent of said particulate material, and said outer shell having a glass transition temperature above that of said core.

2. Particulate material in accordance with claim 1 wherein said core has a glass transition temperature at least 50° C. below that of said outer shell and said core-forming monomers and said shell-forming monomers are introduced into the polymerization reaction incrementally.

3. Particulate material in accordance with claim 1 wherein said core has a glass transition temperature at least 100° C. below that of said outer shell and said particulate material has about 0.04 to about 1 micron average diameter.

4. Particulate material consisting essentially of
   (1) a core of crosslinked acrylic polymer of core-forming monomers consisting essentially of
      (a) a minor and crosslinking amount of a di- or tri-functional monomer containing 2 or more non-conjugated terminal ethylenic groups selected from the group consisting of divinyl benzene, a diester of acrylic or methacrylic acid and a $C_2$–$C_8$ dihydric alcohol and a triester or acrylic or methacrylic acid and a $C_2$–$C_8$ trihydric alcohol, said minor and crosslinked amount not exceeding about 20 mole percent of the core-forming monomers, and
      (b) a remainder consisting essentially of an ester of acrylic acid and a $C_2$–$C_8$ monohydric alcohol, said remainder constituting at a minimum about 80 mole percent of the core forming monomers,
   (2) an outer shell consisting essentially of the polymerization product of monomers selected from the group consisting of
      (a) methyl methacrylate and
      (b) a mixture of methyl methacrylate and a remainder selected from the group consisting of monofunctional monoacrylates, difunctional monoacrylates, diacrylates, monovinyl hydrocarbons, divinyl hydrocarbons, acrylonitrile, methacrylonitrile, acrylic acid, and methacrylic acid, said methyl methacrylate comprising at least 30 mole percent of said mixture and
   (3) an intermediate layer between said core and said shell consisting essentially of the copolymerization product of said core-forming monomers and said shell-forming monomers and formed by introducing said shell-forming monomers into the polymerization of said core-forming monomers when polymerization of said core-forming monomers is between about 50 and about 90 percent complete, said core-forming monomers comprising about 10 to about 90 weight percent of said particulate material and said shell-forming monomers comprising about 90 to about 10 weight percent of said particulate material, and said core having a glass transition temperature at least 50° C. below that of said outer shell.

5. Particulate material in accordance with claim 4 having average diameter in the range of about 0.04 to about 1 micron and said shell-forming monomers are introduced into the polymerization reaction incrementally.

6. Particulate material in accordance with claim 4 wherein said minor and crosslinking amount constitutes about 2 to about 20 mole percent of said core and said remainder constitutes about 98 to about 80 mole percent of said core.

7. Particulate material in accordance with claim 4 wherein said intermediate layer is formed by introducing said shell-forming monomers into the polymerization of said core-forming monomers when polymerization of said core-forming monomers is between 70 and 89 percent complete and said shell-forming monomers are introduced into the polymerization of said core-forming monomers incrementally.

8. Particulate material having average diameter in the range of about 0.04 to about 1 micron and consisting essentially of
   (1) a core of crosslinked acrylic polymer of core-forming monomers consisting essentially of
      (a) a minor and crosslinking amount of a di- or tri-functional monomer containing 2 or more non-conjugated terminal ethylenic groups selected from the group consisting of divinyl benzene and diesters of acrylic or methacrylic acid and a $C_2$–$C_8$ dihydric alcohol, said minor and crosslinking amount not exceeding about 20 mole percent of the core-forming monomers and
(b) a remainder consisting essentially of an ester of acrylic acid and a $C_2$–$C_8$ monohydric alcohol, said remainder constituting about 80 mole percent of the core reactants, (2) an outer shell having a glass transition temperature above that of said core and consisting essentially of the polymerization product of shell-forming monomers selected from the group consisting of
  (a) methyl methacrylate,
  (b) a mixture of about 30 to about 99 mole percent methyl methacrylate and about 1 to about 70 mole percent of an ester of acrylic or methacrylic acid and a $C_2$–$C_8$ monohydric alcohol,
  (c) a mixture of about 30 to about 99 mole percent methyl methacrylate, about 1 to about 30 mole percent of a monovinyl hydrocarbon selected from the group consisting essentially of styrene and methyl styrene, and 0 to about 69 mole percent of an ester of acrylic or methacrylic acid and a $C_2$–$C_8$ monohydric alcohol,
  (d) a mixture of about 30 to about 99 mole percent methyl methacrylate, about 1 to about 45 mole percent of a difunctional monoacrylate selected from the group consisting of glycidyl methacrylate, hydroxyethyl acrylate, hydroxyethyl methacrylate, hydroxypropyl acrylate, hydroxypropyl methacrylate and 0 to about 69 mole percent of an alpha-beta unsaturated monomer selected from acrylonitrile, methacrylonitrile, styrene, methyl styrene, esters of acrylic or methacrylic acid and a $C_2$–$C_8$ monohydric alcohol, and isobornyl methacrylate, and
  (e) a mixture of about 30 to about 99 mole percent methyl methacrylate, about 1 to about 20 mole percent of a divinyl compound selected from the group consisting of divinyl benzene and diesters of acrylic or methacrylic acid and a $C_2$–$C_8$ dihydric alcohol, and 0 to 69 mole percent of an alpha-beta unsaturated monomer selected from acrylonitrile, methacrylonitrile, styrene, methyl styrene, esters of acrylic or methacrylic acid with a $C_2$–$C_8$ monohydric alcohol, isobornyl methacrylate, glycidyl methacrylate, hydroxyethyl acrylate, hydroxyethyl methacrylate, hydroxypropyl acrylate and hydroxypropyl methacrylate, and (3) an intermediate layer between said core and said shell consisting essentially of the copolymerization product of said core-forming monomers and said shell-forming monomers and formed by introducing said shell-forming monomers into the polymerization of said core-forming monomers when polymerization of said core-forming monomers is between about 50 and about 90 percent complete, said core-forming monomers comprising about 10 to about 90 weight percent of said particulate material and said shell-forming monomers comprising about 90 to about 10 weight percent of said particulate material.

9. Particulate material in accordance with claim 8 wherein said minor and crosslinking amount constitutes about 2 to about 20 mole percent of said core and said remainder constitutes about 98 to about 80 mole percent of said core.

10. Particulate material in accordance with claim 8 wherein said intermediate layer is formed by introducing said shell-forming monomers into the polymerization of said core-forming monomers when polymerization of said core-forming monomers is between 70 and 89 percent complete.

11. Particulate material in accordance with claim 8 having average diameter in the range of about 0.1 to about 0.2 micron.

12. Particulate material in accordance with claim 8 wherein said core is a copolymer of butyl acrylate and 1,3-butylene diacrylate of 1,3-butylene dimethacrylate.

13. Particulate material in accordance with claim 8 wherein said core is a copolymer of 2-ethyl hexyl acrylate and 1,3-butylene dimethacrylate or 1,3-butylene diacrylate.

14. Particulate material in accordance with claim 8 wherein said core has a glass transition temperature at least 50° C. below that of said shell.

15. Particulate material consisting essentially of
(1) a core of crosslinked acrylic copolymer of core-forming monomers consisting essentially of
  (a) about 70 to about 90 mole percent of
    (1) a minor and crosslinking amount of a di- or tri-functional monomer containing 2 or more non-conjugated terminal ethylenic groups selected from divinylbenzene, a diester of acrylic or methacrylic acid and a $C_2$–$C_8$ dihydric alcohol and a triester of acrylic or methacrylic acid and a $C_2$–$C_8$ trihydric alcohol, said minor and crosslinking amount not exceeding about 20 mole percent of the core reactants and
    (2) remainder consisting essentially of a monofunctional monoacrylate, said remainder constituting at a minimum about 80 mole percent of the core reactants, and
  (b) about 10 to about 30 mole percent of a monovinyl hydrocarbon selected from styrene and methyl styrene,
(2) an outer shell consisting essentially of the polymerization product of shell-forming monomers selected from the group consisting of
  (a) methyl methacrylate and
  (b) a mixture of about 30 to about 99 mole percent methyl methacrylate and about 70 to about 1 mole percent of monomers selected from the group consisting of monofunctional monoacrylates, difunctional monoacrylates, monovinyl hydrocarbons, divinyl hydrocarbons, acrylonitrile, methacrylonitrile, acrylic acid and methacrylic acid, and
(3) an intermediate layer between said core and said shell consisting essentially of the copolymerization product of said core-forming monomers and said shell-forming monomers and formed by introducing said shell-forming monomers into the polymerization of said core-forming monomers when polymerization of said core-forming monomers is between about 50 and about 90 percent complete, said core-forming monomers comprising about 10 to about 90 weight percent of said particulate material, said shell-forming monomers comprising about 90 to about 10 weight percent of said particulate material, and said core having a glass transition temperature at least 50° C. below that of said outer shell.

16. Particulate material in accordance with claim 15 having average diameter in the range of 0.04 to 1 micron.

17. Particulate material in accordance with claim 15 wherein said minor and crosslinking amount constitutes about 2 to about 20 mole percent of said core and said remainder constitutes about 98 to about 80 mole percent of said core.

18. An article of manufacture consisting essentially of the molded product of particulate, thermoplastic material consisting essentially of
(1) a core of crosslinked acrylic polymer of core-forming monomers consisting essentially of
  (a) a minor and crosslinking amount of a di- or tri-functional monomer containing 2 or more non-conjugated terminal ethylenic groups, said minor and crosslinking amount not exceeding about 20 mole percent of the core-forming monomers, and
  (b) a remainder consisting essentially of a monofunctional monoacrylate, said remainder constituting at a minimum about 80 mole percent of the core-forming monomers, (2) an outer shell consisting essentially of the polymerization product of shell-forming monomers selected from the group consisting of
  (a) methyl methacrylate and
  (b) a mixture of methyl methacrylate and a remainder selected from the group consisting of monofunctional monoacrylates, difunctional monoacrylates, monovinyl hydrocarbons, divinyl hydrocarbons, acrylonitrile, methacrylonitrile, acrylic acid and methacrylic acid, said methyl methacrylate comprising at least 30 mole percent of said mixture, and
(3) an intermediate layer between said core and said shell consisting essentially of the copolymerization product of said core-forming monomers and said shell-forming monomers and formed by introducing said shell-forming monomers into the polymerization of said core-forming monomers when polymerization of said core-forming monomers is between about 50 and about 90 percent complete, said core-forming monomers comprising about 10 to about 90 weight percent of said particulate material, said shell-forming monomers comprising about 90 to about 10 weight percent of said particulate material, and said outer shell having a glass transition temperature above that of said core.

References Cited

UNITED STATES PATENTS

| | | | |
|---|---|---|---|
| 3,290,265 | 12/1966 | Kaneko | 260—29.6 |
| 3,297,621 | 1/1967 | Taft | 260—29.6 |
| 3,401,213 | 9/1968 | Trementozzi et al. | 260—880 |
| 3,562,235 | 2/1971 | Ryan | 260—885 |

FOREIGN PATENTS

| | | | |
|---|---|---|---|
| 1,117,124 | 6/1968 | Great Britain | 260—885 |
| 986,865 | 3/1965 | Great Britain | 260—885 |

MURRAY TILLMAN, Primary Examiner

C. J. SECCURO, Assistant Examiner

U.S. Cl. X.R.

260—41 B, 41 AG, 876 R, 881, 885